United States Patent
Niesen et al.

(10) Patent No.: US 10,495,763 B2
(45) Date of Patent: Dec. 3, 2019

(54) MOBILE PLATFORM POSITIONING USING SATELLITE POSITIONING SYSTEM AND VISUAL-INERTIAL ODOMETRY

(71) Applicant: QUALCOMM Incorporated, San Diego, CA (US)

(72) Inventors: Urs Niesen, Summit, NJ (US); Venkatesan Nallampatti Ekambaram, Hillsboro, OR (US); Lionel Jacques Garin, Palo Alto, CA (US); Jubin Jose, Belle Mead, NJ (US); Xinzhou Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 15/019,833

(22) Filed: Feb. 9, 2016

(65) Prior Publication Data
US 2017/0227656 A1   Aug. 10, 2017

(51) Int. Cl.
*G01S 19/47*   (2010.01)
*G01S 19/40*   (2010.01)
(Continued)

(52) U.S. Cl.
CPC ............ *G01S 19/47* (2013.01); *G01C 21/165* (2013.01); *G01S 5/163* (2013.01); *G01S 19/40* (2013.01)

(58) Field of Classification Search
CPC .......... G01S 19/47; G01S 19/49; G01S 19/40; G01S 5/163; G01C 21/165
See application file for complete search history.

(56) References Cited

U.S. PATENT DOCUMENTS

| 5,590,043 A * | 12/1996 | McBurney ............. G01S 19/29 342/357.23 |
| 2009/0319170 A1* | 12/2009 | Madsen ............... A01B 69/001 701/532 |

(Continued)

FOREIGN PATENT DOCUMENTS

EP   2135498 B1   6/2012

OTHER PUBLICATIONS

Agrawal M., et al., "Real-time Localization in Outdoor Environments using Stereo Vision and Inexpensive GPS," 2006, 6 pages.
(Continued)

*Primary Examiner* — Bernarr E Gregory
*Assistant Examiner* — Fred H Mull
(74) *Attorney, Agent, or Firm* — Thien T. Nguyen

(57) ABSTRACT

A method of determining a trajectory of a mobile platform includes obtaining a satellite positioning system (SPS) measurement from one or more SPS signals acquired by an SPS receiver of the mobile platform. The method also includes obtaining a visual-inertial odometry (VIO) measurement of the mobile platform from a VIO system of the mobile platform. A first position estimate of the mobile platform is determined based, at least in part, on the SPS measurement and the VIO measurement. The method then includes adjusting the first position estimate to generate a smoothed position estimate based, in part, on a smoothing parameter that controls a smoothness of the trajectory. The trajectory of the mobile platform is then determined, at least in part, using the smoothed position estimate.

19 Claims, 6 Drawing Sheets

(51) Int. Cl.
  *G01C 21/16* (2006.01)
  *G01S 5/16* (2006.01)
  *G01S 19/39* (2010.01)

(56) References Cited

U.S. PATENT DOCUMENTS

2015/0219767 A1   8/2015  Humphreys et al.
2017/0169569 A1*  6/2017  Ishikawa .................. G06T 7/74

OTHER PUBLICATIONS

Dusha D., et al., "Error Analysis and Attitude Observability of a Monocular GPS/Visual Odometry Integrated Navigation Filter," Nov. 30, 2011, pp. 1-41.
Rehder J., et al., "Global Pose Estimation with Limited GPS and Long Range Visual Odometry," IEEE Conference on Robotics and Automation, 2012, 7 pages.

\* cited by examiner

MOBILE PLATFORM POSITIONING USING SATELLITE POSITIONING SYSTEM AND VISUAL-INERTIAL ODOMETRY

FIELD OF DISCLOSURE

This disclosure relates generally to techniques for use in determining positioning information for a mobile platform, and in particular, but not exclusively, techniques for use in tracking movements of a mobile platform based, at least in part, on positioning information obtained from a Satellite Positioning Systems (SPS) and a visual-inertial odometry (VIO) system.

BACKGROUND

Mobile platforms offer increasingly sophisticated capabilities associated with the motion and/or position location sensing of the mobile platform. New software applications, such as, for example, those related to personal productivity, collaborative communications, social networking, and/or data acquisition, may utilize motion and/or position sensors to provide new features and services to consumers.

Such motion and/or position determination capabilities may be provided using Satellite Positioning Systems (SPS), such as a global positioning system (GPS). However, position determinations based on SPS measurements alone may have inherent errors on the order of a few meters. Such accuracy may not be sufficient for certain applications. In mobile platforms, position accuracy can be improved by augmenting measurements derived from SPS with other available sensors/systems.

One such system that may be available to the mobile platform is a Visual-Inertial Odometry (VIO) system. Certain example VIO systems may use information from consecutive or otherwise temporally-separated images obtained from one or more digital cameras to estimate displacements of the mobile platform from one or more previous positions. These displacement estimates may, in certain instances, be of very high quality, e.g., being off by less than 1%. While the errors in the displacement estimates of some VIO systems may be relatively small, they may accumulate over time, which may lead to a significant drift in position estimates. This may be particularly problematic in vehicular applications, such as Advanced Driver Assistance Systems (ADAS) or robotics applications, such as drone navigation, where a large drift may interfere with proper route planning and/or mapping.

SUMMARY

The following presents a simplified summary relating to one or more aspects and/or embodiments associated with the mechanisms disclosed herein for determining a trajectory using a satellite positioning system (SPS) and visual-inertial odometry (VIO). As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary presents certain concepts relating to one or more aspects and/or embodiments relating to the mechanisms disclosed herein to smooth a trajectory of a mobile platform using SPS and VIO in a simplified form to precede the detailed description presented below.

According to one aspect, a method of determining a trajectory of a mobile platform includes obtaining a satellite positioning system (SPS) measurement from one or more SPS signals acquired by an SPS receiver of the mobile platform. The method also includes obtaining a visual-inertial odometry (VIO) measurement of the mobile platform from a VIO system of the mobile platform. A first position estimate of the mobile platform is determined based, at least in part, on the SPS measurement and the VIO measurement. The method then includes adjusting the first position estimate to generate a smoothed position estimate based, in part, on a smoothing parameter that controls a smoothness of the trajectory. The trajectory of the mobile platform is then determined, at least in part, using the smoothed position estimate.

According to another aspect, an apparatus for determining a trajectory of a mobile platform includes means for obtaining a satellite positioning system (SPS) measurement from one or more SPS signals acquired by an SPS of the mobile platform and means for obtaining a visual-inertial odometry (VIO) measurement of the mobile platform from a VIO system of the mobile platform. The apparatus also includes means for determining a first position estimate of the mobile platform based, at least in part, on the SPS measurement and the VIO measurement and means for adjusting the first position estimate to generate a smoothed position estimate based, in part, on a smoothing parameter that controls a smoothness of the trajectory. The apparatus further includes means for determining the trajectory of the mobile platform, at least in part, using the smoothed position estimate.

According to yet another aspect, an apparatus for determining a trajectory of a mobile platform includes at least one processor and at least one memory coupled to the at least one processor. The at least one processor and the at least one memory are configured to direct the apparatus to: (i) obtain a satellite positioning system (SPS) measurement from one or more SPS signals acquired by an SPS receiver of the mobile platform; (ii) obtain a visual-inertial odometry (VIO) measurement of the mobile platform from a VIO system of the mobile platform; (iii) determine a first position estimate of the mobile platform based, at least in part, on the SPS measurement and the VIO measurement; (iv) adjust the first position estimate to generate a smoothed position estimate based, in part, on a smoothing parameter that controls a smoothness of the trajectory; and (v) determine the trajectory of the mobile platform, at least in part, using the smoothed position estimate.

According to another aspect, a non-transitory computer-readable storage medium includes computer-executable instructions recorded thereon. Executing the computer-executable instructions on one or more processors causes the one or more processors to: (i) obtain a satellite positioning system (SPS) measurement from one or more SPS signals acquired by an SPS receiver of a mobile platform; (ii) obtain a visual-inertial odometry (VIO) measurement of the mobile platform from a VIO system of the mobile platform; (iii) determine a first position estimate of the mobile platform based, at least in part, on the SPS measurement and the VIO measurement; (iv) adjust the first position estimate to generate a smoothed position estimate based, in part, on a smoothing parameter that controls a smoothness of the trajectory; and (v) determine the trajectory of the mobile platform, at least in part, using the smoothed position estimate.

Other objects and advantages associated with the mechanisms disclosed herein to smooth a trajectory of a mobile platform described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
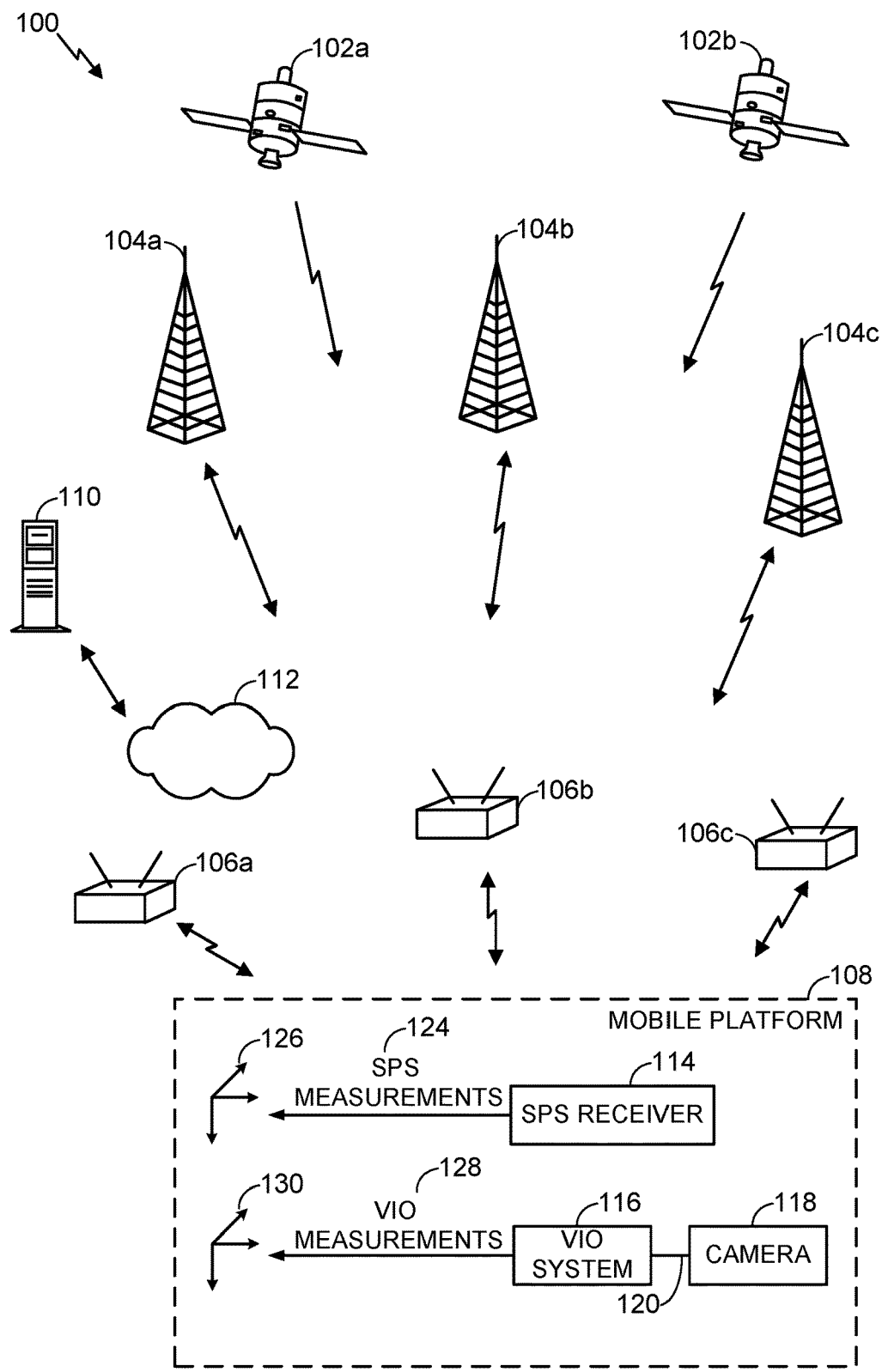
FIG. 1 illustrates an example operating environment for a mobile platform that can determine position using one or more techniques and track a trajectory of the mobile platform, according to one aspect of the disclosure.

According to one aspect of the disclosure, FIG. 1 illustrates an exemplary operating environment 100 for a mobile platform 108 that can determine its position using one or more techniques and determine (e.g., track) a trajectory of the mobile platform 108 within environment 100. Embodiments are directed to a mobile platform 108 which may determine its position utilizing data from both a Satellite Positioning System (SPS) 114 and a Visual-Inertial Odometer (VIO) system 116. The SPS measurements 124 generated by the SPS receiver 114 may include one or more range-rate measurements (e.g., GPS Doppler measurements), one or more pseudorange measurements, and/or one or more SPS velocity measurements. The range-rate measurements may contain information, such as GPS Doppler measurements, that allow a determination of a velocity of the mobile platform 108. The pseudorange measurements may provide information about the distance between the SPS receiver 114 and a respective satellite. The SPS velocity measurements are representative of a velocity of the mobile platform 108.

The VIO system 116 utilizes several sequential images 120 captured by a camera 118 to estimate a relative position, velocity, acceleration, and/or orientation of the mobile platform 108. The camera 118 may include a single monocular camera, a stereo camera, and/or an omnidirectional camera. In operation, the VIO system 116 acquires the images 120 generated by the camera 118 in order to generate the VIO measurements 128. In one aspect, the VIO system 116 may apply one or more image processing techniques to the images 120, detect one or more features, match those features across multiple frames to construct an optical flow, and estimate motion of the mobile platform 108 based on the optical flow. The VIO system 116 then generates VIO measurements 128. In one aspect, the VIO measurements 128 are VIO velocity measurements representative of an estimated velocity of the mobile platform 108. In another aspect, the VIO measurements 128 are VIO displacement measurements representative of a positional displacement of the mobile platform 108.

By combining the VIO measurements 128 with the SPS measurements 124, the mobile platform 108 may increase the accuracy of position determinations of the mobile platform 108. However, the SPS measurements 124 and the VIO measurements 128 may be each made with respect to separate coordinate systems. For example, the SPS measurements 124 may be with respect to a global reference frame 126, such as an Earth-Centered, Earth-Fixed (ECEF) coordinate system, such as the WGS84 coordinate system used with GPS, while the VIO measurements 128 may be with respect to a separate local reference frame 130. While the global reference frame 126 may be known and common to any system using the same satellite positioning network, the local reference frame 130 may depend, in part, on the specific orientation of the mobile platform 108. That is, the local reference frame 130 may change depending on the position and/or orientation of the mobile platform 108 within environment 100. Thus, in order to combine the VIO measurements 128 with the SPS measurements 124, the mobile platform 108 may align local reference frame 130 with the global reference frame 126. In one aspect, the mobile platform 108 determines one or more orientation parameters (e.g., rotation matrix) to align the local reference frame 130 with the global reference frame 126 based on the SPS measurements 124 and the VIO measurements 128.

The operating environment 100 may contain one or more different types of wireless communication systems and/or wireless positioning systems. In the embodiment shown in FIG. 1, one or more space vehicles (SV) (e.g., Satellite Positioning System (SPS) satellites 102a, 102b) may be used as an independent source of position information for the mobile platform 108. The SPS receiver 114 of mobile platform 108 may include one or more dedicated SPS receivers specifically designed to receive signals for deriving geo-location information from the SPS satellites 102a, 102b. In certain implementations, SPS receiver 114 (and also like example SPS receiver 208 of FIG. 2) may be configured to acquire and make use of SPS signals from a plurality of SPS, separately or together. By way of a non-limiting example, an SPS receiver 114/208 may acquire SPS signals from one or more GNSS, such as, e.g., GPS, GLONASS, Galileo, etc., or from one or more regional navigation systems, such as, e.g., BeiDou (China), the Indian Regional Navigation Satellite System (IRNSS), etc., or some combination thereof.

The operating environment 100 may also include one or more Wide Area Network Wireless Access Points (WAN-WAPs) 104a, 104b, which may be used for wireless voice and/or data communication, and as another source of independent position information for the mobile platform 108. The WAN-WAPs 104a-104b may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104b within the WWAN may operate from fixed positions, and provide network coverage over large metropolitan and/or regional areas.

The operating environment 100 may further include one or more Local Area Network Wireless Access Points (LAN-WAPs) 106a, 106b, 106c, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106a-106c may be part of, for example, Wi-Fi networks (802.11x), cellular piconets and/or femtocells, Bluetooth networks, etc.

The mobile platform 108 may derive position information from any one or more of the SPS satellites 102a, 102b, the WAN-WAPs 104a-104b, and/or the LAN-WAPs 106a-106c. Each of the aforementioned systems can provide an independent estimate of the position for the mobile platform 108 using different techniques. In some embodiments, the mobile platform 108 may combine the solutions derived from each of the different types of access points to improve the accuracy of the position data. When deriving position using the SPS satellites 102a, 102b, the mobile platform 108 may utilize a receiver specifically designed for use with the SPS that extracts position, using conventional techniques, from a plurality of signals transmitted by SPS satellites 102a, 102b.

SPS satellites 102a and 102b are part of a satellite system that typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting space vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein satellite systems used herein may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104b may take the form of base stations within a digital cellular network, and the mobile platform 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104a-104b may actually be moveable or otherwise capable of being relocated, for illustration purposes it will be assumed that they are essentially arranged in a fixed position.

The mobile platform 108 may perform position determination using known time-of-arrival (TOA) techniques such as, for example, Advanced Forward Link Trilateration (AFLT). In other embodiments, each WAN-WAP 104a-104b may comprise a WiMAX wireless networking base station. In this case, the mobile platform 108 may determine its position using TOA techniques from signals provided by the WAN-WAPs 104a-104b. The mobile platform 108 may determine positions either in a stand-alone mode, or using the assistance of a positioning server 110 and network 112 using TOA techniques. Furthermore, various embodiments may have the mobile platform 108 determine position information using WAN-WAPs 104a-104b, which may have different types. For example, some WAN-WAPs 104a-104b may be cellular base stations, and other WAN-WAPs 104a-104b may be WiMAX base stations. In such an operating environment, the mobile platform 108 may be able to exploit the signals from each different type of WAN-WAP 104a-104b, and further combine the derived position solutions to improve accuracy.

When deriving position using the WLAN, the mobile platform 108 may utilize TOA techniques with the assistance of the positioning server 110 and the network 112. The positioning server 110 may communicate to the mobile platform 108 through network 112. Network 112 may include a combination of wired and wireless networks which incorporate the LAN-WAPs 106a-106c. In one embodiment, each LAN-WAP 106a-106c may be, for example, a Wi-Fi wireless access point, which is not necessarily set in a fixed position and can change location. The position of each LAN-WAP 106a-106c may be stored in the positioning server 110 in a common coordinate system. In one embodiment, the position of the mobile platform 108 may be determined by having the mobile platform 108 receive signals from each LAN-WAP 106a-106c. Each signal may be associated with its originating LAN-WAP based upon some form of identifying information that may be included in the received signal (such as, for example, a MAC address). The mobile platform 108 may then sort the received signals based upon signal strength, and derive the time delays associated with each of the sorted received signals. The mobile platform 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106c, of the mobile platform 108. The positioning server 110 may generate and provide a Location Configuration Indication (LCI) message or the like to the mobile platform 108 that includes a pointer to the position of the mobile platform 108 in a local coordinate system. The LCI message or other like messages may also include other points of interest in relation to the location of the mobile platform 108. When computing the position of the mobile platform 108, the positioning server 110 may take into account the different delays which can be introduced by elements within the wireless network.

The position determination techniques described above may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

As used herein, mobile platform 108 may be a device such as a vehicle (manned or unmanned), a robot, a cellular or other wireless communication device, a personal communication system (PCS) device, a personal navigation device, a Personal Information Manager (PIM), a Personal Digital Assistant (PDA), a laptop or other suitable mobile device that is capable of capturing or otherwise obtaining images and navigating or supporting navigation or other like motion-based processes using measurements from one or more sensors. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile platform."

Furthermore, in one embodiment, the mobile platform 108 may be suitably linked to a vehicle through one or more communication interfaces (e.g., a Bluetooth interface, an RF antenna, a wired connection, etc.) that enable the mobile platform 108 to read SPS measurements 124 and/or VIO measurements 128 obtained by the vehicle, itself. Furthermore, an application program interface (API) that supports communication between the mobile platform 108 and a vehicle may make the SPS measurements 124 and/or VIO measurements 128, obtained by the vehicle, available to the mobile platform 108.

Figure 2:
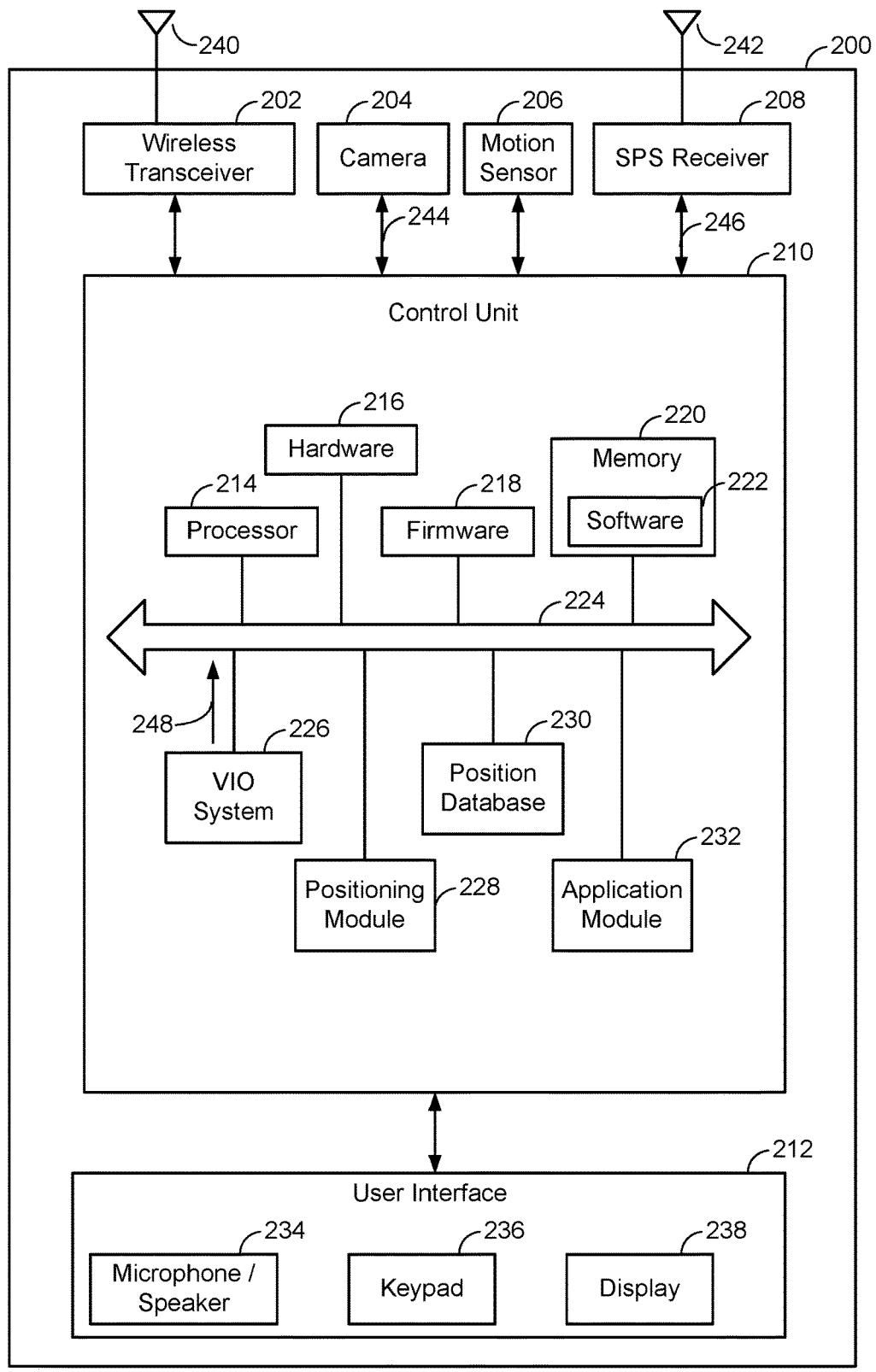
FIG. 2 illustrates an example mobile platform that may be used in an operating environment that can determine position using one or more techniques and track a trajectory of the mobile platform, according to one aspect of the disclosure.

FIG. 2 illustrates an example mobile platform 200 that may be used in an operating environment 100 that can determine position using one or more techniques and track a trajectory of the mobile platform 200, according to one aspect of the disclosure. Mobile platform 200 is one possible implementation of mobile platform 108 of FIG. 1.

The various features and functions illustrated in the diagram of FIG. 2 are connected together using a common data bus 224 which is meant to represent that these various features and functions are operatively coupled together. Those skilled in the art will recognize that other connections, mechanisms, features, functions, or the like, may be provided and adapted as necessary to operatively couple and configure an actual portable device. Further, it is also recognized that one or more of the features or functions illustrated in the example of FIG. 2 may be further subdivided or two or more of the features or functions illustrated in FIG. 2 may be combined.

The mobile platform 200 may include one or more wireless transceivers 202 that may be connected to one or more antennas 240. The wireless transceiver 202 may include suitable devices, hardware, and/or software for communicating with and/or detecting signals to/from WAN-WAPs 104a-104c, and/or directly with other wireless devices within a network. For example, the wireless transceiver 202 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The wireless transceiver 202 may also include one or more local area network (LAN) transceivers that may be connected to one or more antennas 240. For example, the wireless transceiver 202 may include suitable devices, hardware, and/or software for communicating with and/or detecting signals to/from LAN-WAPs 106a-106c, and/or directly with other wireless devices within a network. In one aspect, the wireless transceiver 202 may include a Wi-Fi (802.11x) communication system suitable for communicating with one or more wireless access points; however in other aspects, the wireless transceiver 202 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106a-106c and/or WAN-WAPs 104a-104b. Specifically, when the term "WAP" is used, it should be understood that embodiments may include a mobile platform 200 that can exploit signals from a plurality of LAN-WAPs 106a-106c, a plurality of WAN-WAPs 104a-104b, or any combination of the two. The specific type of WAP being utilized by the mobile platform 200 may depend upon the environment of operation. Moreover, the mobile platform 200 may dynamically select between the various types of WAPs in order to arrive at an accurate position solution. In other embodiments, various network elements may operate in a peer-to-peer manner, whereby, for example, the mobile platform 200 may be replaced with the WAP, or vice versa. Other peer-to-peer embodiments may include another mobile platform (not shown) acting in place of one or more WAP.

As shown in FIG. 2, mobile platform 200 may also include a camera 204. Camera 204 may be a single monocular camera, a stereo camera, and/or an omnidirectional camera. In one aspect, camera 204 is calibrated such that the camera parameters (e.g., focal length, displacement of the optic center, radial distortion, tangential distortion, etc.) are known. Camera 204 is coupled to control unit 210 to provide images 244 to the control unit 210.

The illustrated example of mobile platform 200 also includes a motion sensor 206. Motion sensor 206 may be coupled to control unit 210 to provide movement and/or orientation information which is independent of motion data derived from signals received by the wireless transceiver 202, the SPS receiver 208, and the VIO system 226.

By way of example, the motion sensor 206 may include an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 206 may include a plurality of different types of devices and combine their outputs in order to provide motion information. For example, the motion sensor 206 may use a combination of a multi-axis accelerometer and orientation sensors to provide the ability to compute positions in 2-D and/or 3-D coordinate systems.

A Satellite Positioning System (SPS) receiver 208 may also be included in the mobile platform 200. The SPS receiver 208 may be connected to the one or more antennas 242 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile platforms 200 position using measurements obtained by any suitable SPS algorithm. In one aspect, SPS receiver 208 is coupled to control unit 210 to provide one or more SPS measurements 246 to the control unit 210. In one example, the SPS measurements 246 are range-rate measurements, such as GPS Doppler range-rate measurements. In another example, SPS receiver 208 is configured to determine an SPS velocity of the mobile platform 200 based on the range-rate measurements such that the SPS measurements 246 are the SPS velocity measurements. In yet another example, the SPS measurements 246 are the pseudorange measurements that are representative of a distance from the SPS receiver 208 to a respective satellite (e.g., 102a, 102b). That is, SPS measurements 246 may include the range-rate measurements by themselves, the SPS velocity measurements by themselves, the pseudorange measurements themselves, and/or any combination of the three.

Mobile platform 200 also includes a control unit 210 that is connected to and communicates with the wireless transceiver 202, the camera 204, the motion sensor 206, the SPS receiver 208, and user interface 212, if present. In one aspect, the control unit 210 accepts and processes images 244 received from the camera 204 as well as SPS measurements 246 received from SPS receiver 208. Control unit 210 may be provided by a processor 214 and associated memory 220, hardware 216, firmware 218, and software 222.

The processor 214 may include one or more microprocessors, microcontrollers, and/or digital signal processors that provide processing functions, as well as other calculation and control functionality. The processor 214 may also include memory 220 for storing data and software instructions for executing programmed functionality within the mobile platform 200. The memory 220 may be on-board the processor 214 (e.g., within the same IC package), and/or the memory may be external memory to the processor 214 and functionally coupled over a data bus 224. The functional details associated with aspects of the disclosure will be discussed in more detail below.

Control unit 210 may further include a Visual-Inertial Odometry (VIO) system 226, a positioning module 228, a position database 230, and an application module 232. VIO system 226 may be configured to generate VIO measurements 248 in response to the images 244 received from camera 204. The positioning module 228 may be configured to determine a position of the mobile platform 200 based on one or more positioning techniques. For example, positioning module 228 may be configured to determine a position of the mobile platform 200 by combining the VIO measurements 248 with the SPS measurements 246. The position database 230 may be configured to store and update the position and/or orientation of the mobile platform 200. That is, as the control unit 210 determines a new position and/or orientation of the mobile platform 200, the position database 230 may be updated. The updated position and orientation information may then be provided, e.g., by displaying a digital map with the new position on the display 238 or by providing additional navigation instructions on the display and/or via speaker 234. The positions and/or orientations stored in the position database 230 may be representative of a trajectory of the mobile platform 200 as the mobile platform 200 moves through an environment (e.g., environment 100). In combining the VIO measurements 248 with the SPS measurements 246, the positioning module 228 may determine a displacement estimate of the mobile platform 200 based on one or more of the VIO velocity measurements. However, the data provided by the VIO system 226 may be subject to a VIO drift which may cause displacement errors in the estimated displacement of the mobile platform 200. Accordingly, as will be discussed in more detail below, the positioning module 228 may compensate for this VIO drift utilizing one or more SPS measurements 246. In one aspect, the positioning module 228 may compensate for the VIO drift by determining a trajectory of the mobile platform 200 such that the trajectory produced by the compensation is smooth. That is, the positioning module 228 may compensate for VIO drift by generating a trajectory such that large jumps in estimated positions are avoided. The requirement for the smoothness of a trajectory may be important in control applications, where relatively large jumps in position estimates could lead to instability in the route planning and control algorithms. In one example, positioning module 228 utilizes a smoothing parameter to adjust position estimates that provides a trade-off between the smoothness of the generated trajectory with a tracking error.

By way of example, without the smoothness constraints, the positioning module 228 may combine the SPS measurements 246 and the VIO measurements 248 (e.g., VIO velocity measurements) by using a filter, such as a Kalman or a particle filter, where $x_t$ is a first position estimate of the mobile platform 200 at time t estimated from the combined SPS and VIO measurements. Positioning module 228 may then adjust the first position estimate to generate a smoothed position estimate $s_t$ at time t. In one aspect, the positioning module 228 generates the smoothed position estimate by minimizing a cost function that determines a trade-off between: (i) a difference between the smoothed position estimate $s_t$ and the first position estimate $x_t$ (i.e., the tracking error), and (ii) the smoothness of the trajectory produced. The cost function utilized by positioning module 228 may be represented by:

$$\|s_t - x_t\|^2 + \lambda \|s_t - s_{t-1}\|^2 \qquad \text{EQ (1a)}$$

where $\lambda$ is the smoothing parameter, and $s_{t-1}$ is a previous smoothed position estimate. The first term of equation (1), referred to herein as a tracking error, provides a constraint that the smoothed position estimate $s_t$ be relatively close to the first position estimate $x_t$. The second term of equation (1) provides the smoothness constraint. In one example, the smoothing parameter $\lambda$ is a fixed nonnegative number and may be chosen based on the particular application (e.g., ADAS, route planning, drone control system, etc.).

In another example, the VIO measurement 248 may be also used directly for the smoothing. Letting $v_t$ denote the displacement as reported by the VIO system 226 at time t, the positioning module 228 may utilize the cost function $$\|s_t - x_t\|^2 + \lambda \|s_t - s_{t-1} - v_t\|^2. \qquad \text{EQ (1b)}$$

The first term of equation (1b) is again the tracking error. The second term provides a constraint that the displacement of the smoothed position estimates be relatively close to those measured by the VIO system 226. The smoothing parameter $\lambda$ may again be chosen to trade off between these two conflicting constraints as explained above.

In some applications, the smoothed position estimate $s_t$ may be chosen by the positioning module 228 so as to minimize the expectation of a sum of the cost function of equations (1a) or (1b) over a horizon of T steps. For example, a value of T=1 corresponds to positioning module 228 taking only the cost at the current time t into consideration. For T=1, an optimal smoothed position estimate $s_t$ for cost equation (1a) may be represented by:

$$s_t = \frac{1}{1+\lambda}(\lambda s_{t-1} + x_t) \qquad \text{EQ (2a)}$$

For T=1, an optimal smoothed position estimate $s_t$ for cost equation (1b) may be represented by:

$$s_t = \frac{1}{1+\lambda}(\lambda(s_{t-1} + v_t) + x_t) \qquad \text{EQ (2b)}$$

Furthermore, in some applications, the positioning module 228 may obtain a predicted future position estimate of the mobile platform 200 from the SPS receiver 208 and/or from the VIO system 226. In one example, the predicted future position estimate may be determined by a Kalman filter computing the position estimates. The positioning module 228 may then generate the smoothed position estimate $s_t$ based, in part, on the predicted future position estimate. For example, for T=2, the optimal smoothed position estimate $s_t$ for cost equation (1a) may be represented by:

$$s_t = \frac{1}{1+\lambda+\frac{\lambda}{1+\lambda}}\left(\lambda s_{t-1} + x_t + \frac{\lambda}{1+\lambda}\hat{x}_{t+1}\right) \qquad \text{EQ (3a)}$$

where $\hat{x}_{t+1}$ is the predicted future position estimate of the mobile platform 200 at time t+1. for T=2, the optimal smoothed position estimate $s_t$ for cost equation (1b) may be represented by:

$$s_t = \frac{1}{1+\lambda+\frac{\lambda}{1+\lambda}}\left(\lambda(s_{t-1} + v_t) + x_t + \frac{\lambda}{1+\lambda}(\hat{x}_{t+1} - \hat{v}_{t+1})\right) \qquad \text{EQ (3b)}$$

where $\hat{v}_{t+1}$ is the predicted future displacement at time t+1. Thus, as will be shown below, in some examples, the smoothed position estimate $s_t$ for cost function (1a) may be a convex combination of the previous smoothed position estimate $s_{t-1}$, the first position estimate $x_b$, and one or more predicted future position estimates $\hat{x}_{t+1}$, $\hat{x}_{t+2}$, ... of the mobile platform 200. In other examples, the smoothed position estimate $s_t$ for cost function (1b) may be a convex combination of the propapated previous smoothed position estimate $s_{t-1}+v_t$, the first position estimate $x_b$, and one or more reverse propagated predicted future position estimates $\hat{x}_{t+1}-\hat{x}_{t+1}$, $\hat{x}_{t+2}-\hat{x}_{t+2}-\hat{x}_{t+1}$, ... of the mobile platform 200.

Returning now to FIG. 2, control unit 210 may further include an application module 232. The application module 232 may be a process running on the processor 214 of the mobile platform 200, which requests position information from the positioning module 228. Applications typically run within an upper layer of the software architectures, and may include Indoor/Outdoor Navigation, Buddy Locator, Shopping and Coupons, Asset Tracking, and location Aware Service Discovery.

Processor 214, VIO system 226, positioning module 228, and position database 230 are illustrated separately for clarity, but may be a single unit and/or implemented in the processor 214 based on instructions in the software 222 which is run in the processor 214. Processor 214, VIO system 226, positioning module 228 can, but need not necessarily include, one or more microprocessors, embedded processors, controllers, application specific integrated circuits (ASICs), digital signal processors (DSPs), and the like. The term processor describes the functions implemented by the system rather than specific hardware. Moreover, as used herein the term "memory" refers to any type of computer storage medium, including long term, short term, or other memory associated with mobile platform 200, and is not to be limited to any particular type of memory or number of memories, or type of media upon which memory is stored.

The processes described herein may be implemented by various means depending upon the application. For example, these processes may be implemented in hardware 216, firmware 218, processor 214 in combination with software 222, or any combination thereof. For a hardware implementation, the processor 214 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or processor/software implementation, the processes may be implemented with modules (e.g., procedures, functions, and so on) that perform the functions described herein. Any non-transitory computer-readable medium tangibly embodying instructions may be used in implementing the processes described herein. For example, program code may be stored in memory 220 and executed by the processor 214. Memory 220 may be implemented within or external to the processor 214.

If implemented in firmware 218 and/or processor 214 with software 222, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The mobile platform 200 may include an optional user interface 212 which provides any suitable interface systems, such as a microphone/speaker 234, keypad 236, and display 238 that allows user interaction with the mobile platform 200. The microphone/speaker 234 provides for voice communication services using the wireless transceiver 202. The keypad 236 comprises any suitable buttons for user input. The display 238 comprises any suitable display, such as, for example, a backlit LCD display, and may further include a touch screen display for additional user input modes.

Figure 3:
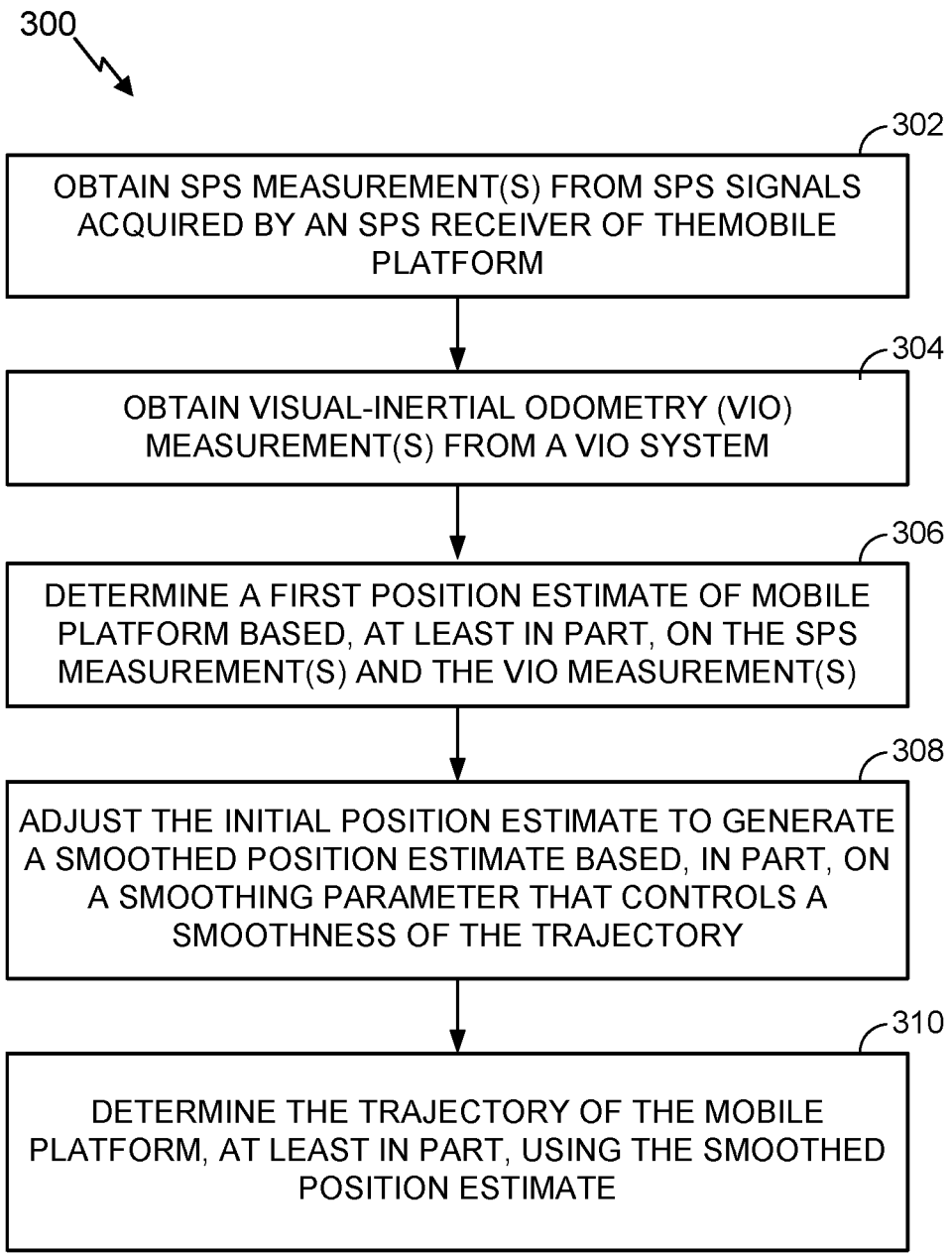
FIG. 3 illustrates an example process of determining a trajectory of a mobile platform, according to one aspect of the disclosure.

FIG. 3 illustrates an example process 300 of determining a trajectory of a mobile platform, according to one aspect of the disclosure. Process 300 may be performed by mobile platform 108 of FIG. 1 and/or mobile platform 200 of FIG. 2.

In a process block 302, positioning module 228 obtains SPS measurements 246 from one or more SPS signals acquired by SPS receiver 208 of the mobile platform 200. In a process block 304, the positioning module 228 obtains VIO measurements 248 from VIO system 226. In operation, the VIO system 226 may utilize the images 244 generated by camera 204 as well as data provided by one or more of the motion sensors 206 (e.g., accelerometer and gyroscope) to generate VIO measurements 248. The VIO measurements 248 generated by the VIO system 226 may, for example in certain implementations, comprise a vector of velocities and rotation matrices at each time instant along with estimates of the variances. The rate at which the VIO measurements 248 are generated by VIO system 226 may, for example in certain implementations, be about 100 per second, which may be much higher than the rate of the SPS measurements 246 generated by SPS receiver 208, which may be, for example, about 1 per second. The rotation matrices included in the VIO measurements 248 may, for example, describe the camera 204 orientation at the current time instant with respect to an initial camera reference frame. In some aspects, certain example VIO measurements 248 may be very accurate and have a drift of around 1% as a function of distance, i.e., an error of 1 m over 100 m. In certain example implementations, some or all VIO measurements 248 may be with respect to a local reference frame 130, while the range-rate measurements obtained from SPS receiver 208 will likely be with respect to a global reference frame 126. Thus, positioning module 228 may be configured to determine an orientation parameter, such as a rotation matrix, to align the local reference frame 130 with the global reference frame 126. In one aspect, aligning the local reference frame 130 with the global reference frame 126 includes translating the VIO measurements 248 to the global reference frame 126 based on the rotation matrix.

In process block 306, the positioning module 228 may determine a first position estimate of the mobile platform 200 based, at least in part, on the SPS measurement 246 and the VIO measurement 248. By way of example, the positioning module 228 may combine the SPS measurements 246 obtained from the SPS receiver 208 with the VIO measurements 248 in order to determine a first position estimate of the mobile platform 200. Combining the SPS measurements 246 with the VIO measurements 248 may include determining a positional displacement of the mobile platform 200 between a current time epoch and a previous time epoch based on the VIO velocity measurements. The displacement may be applied to propagate previous tentative positions to the current time epoch such that the positioning module 228 may apply one or more algorithms to determine the initial position estimate. In some aspects, positioning module 228 may be configured to detect and discard one or more outliers in the SPS measurements 246 based, in part, on the VIO velocity measurements.

In process block 308, the positioning module 228 adjusts the first position estimate to generate a smoothed position estimate based, in part, on a smoothing parameter that controls a smoothness of the produced trajectory of the mobile platform 200. As mentioned above, the smoothness of a trajectory may be important in control applications, where relatively large jumps in position estimates could lead to instability in the route planning and control algorithms. Thus, in some aspects, the positioning module 228 adjusts the first position estimate such that a difference between the smoothed position estimate and a previous smoothed position estimate is less than a difference between the first position estimate and the previous smoothed position estimate. In process block 310, the positioning module 228 determines the trajectory of the mobile platform 200, at least in part, using the smoothed position estimate. In one aspect, determining the trajectory in process block 310 may include storing the smoothed position estimate to position database 230 and/or updating an orientation of the mobile platform 200.

Figure 4:
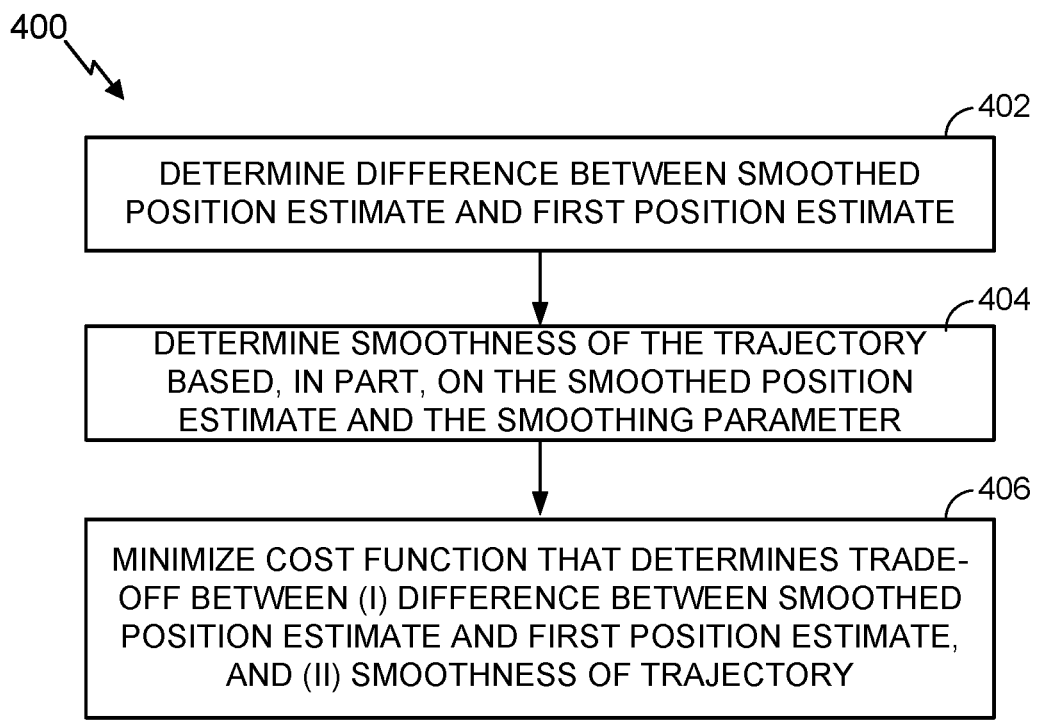
FIG. 4 illustrates an example process of adjusting a first position estimate to generate a smoothed position estimate, according to one aspect of the disclosure.

FIG. 4 illustrates an example process 400 of adjusting a first position estimate to generate a smoothed position estimate, according to one aspect of the disclosure. Process 400 is one possible implementation of process block 308 of FIG. 3. In process block 402, the positioning module 228 determines a difference between the smoothed position estimate and the first position estimate (e.g., $s_t - x_t$ of equations 1a or 1b). In process block 404, the positioning module 228 determines the smoothness of the trajectory based, in part, on the smoothed position estimate and the smoothing parameter. For example, in one aspect, the positioning module 228 may determine the smoothness of the trajectory by applying the smoothing parameter to a difference between the smoothed position estimate and a previous smoothed estimate (e.g., $\lambda \|s_t - s_{t-1}\|^2$ of equation (1a)). In another example, process block 404 may include the positioning module 228 determining the smoothness of the trajectory by applying the smoothing parameter to a difference between: (i) the smoothed position estimate and a previous smoothed estimate; and (ii) a VIO displacement measurement included in the VIO measurement 248 (e.g., $\lambda \|s_t - s_{t-1} v_t\|^2$ of equation (1b)). In process block 406, the positioning module 228 minimizes a cost function, such as equations (1a or 1b), that determines a trade-off between: (i) the difference $(s_t - x_t)$ calculated in process block 402 and (ii) the smoothness of the trajectory calculated in process block 404.

Following is an example implementation of one or more procedures implemented by a positioning module 228 in determining a trajectory of a mobile platform 200 that includes utilizing a smoothing parameter to control a smoothness of the produced trajectory. First, let $\{x_t\}_{t \in N}$ be an M-dimensional vector-valued stochastic Markov process. For example, consider the first-order autoregressive model:

$$x_t \triangleq F_{t-1} x_{t-1} + z_t \quad \text{EQ (4)}$$

for $t \in \{2, 3, \ldots\}$, with initial value $x_1 \triangleq z_1$. The $\{z_t\}_{t \in N}$ are independent Gaussian vector with mean $\mu_t$ and covariance matrix $\Sigma_t$. The parameters $F_t$, $\mu_t$, and $\mu_t$ are assumed to be known.

Positioning module 228 may attempt to smooth the stochastic process $\{x_t\}$. At each time t, the positioning module 228 produces a smoothed position estimate $s_t$ of $x_t$, having access to the first position estimate $x_t$, and the past smoothed position estimates $s_{t-1}$. The quality of the smoothed position estimate $s_t$ may be measured by the cost function:

$$c(s_{t-1}, x_t, s_t) \triangleq \|s_t - x_t\|^2 + \lambda \|s_t - s_{t-1}\|^2 \quad \text{EQ (5)}$$

for some fixed smoothing parameter $\lambda \geq 0$. As with equation (1a), discussed above, the first term of equation (5) measures the deviation from the value $x_t$, and thus captures the requirement that $s_t$ track $x_t$. The second term of equation (5) measures the deviation from the previous smoothed value $s_{t-1}$ and thus captures the requirement that $s_t$ be smooth. The smoothing parameter $\lambda$ determines the balance between these two conflicting requirements. In the following example, the initial state of the system is $s_0 \triangleq 0$. The smoothness term (i.e., $\lambda \|s_t - s_{t-1}\|^2$) of equation (5) couples the values of $s_t$ across time. As a result, when choosing $s_t$ at time t, the expected future behavior of the stochastic process $\{x_t\}$ may need to be taken into account.

For example, let M=1, and assume that the $\{x_t\}$ are independent and identically distributed random variables with mean zero and variance one. Fix a time t, and assume that $s_{t-1}=0$. At time t, assume a value of the first position estimate $x_t=10$. Choosing a large value of the smoothed position estimate $s_t$ would yield two penalties. First, an immediate penalty of $s_t^2$. Second, since the next value of $x_t$ is likely to be closer to zero, a large expected penalty $\mathbb{E}(s_{t+1} - s_t)^2$. Thus, taking the predicted future position estimate $s_{t+1}$ into account, positioning module 228 may choose a smaller value of the smoothed position estimate $s_t$ (i.e., smaller than the first position estimate $x_t = 10$).

Thus, the positioning module 228 may minimize at each time t, the expected cost over the next T time steps, as follows:

$$\min_\pi \sum_{\tau=0}^{T-1} \gamma^\tau \mathbb{E}(c(s_{t+\tau-1}, x_{t+\tau}, s_{t+\tau}) \mid x_t, s_{t-1}), \quad \text{EQ (6)}$$

where the optimization is over all smoothing policies $\pi = \{\pi_t\}$ and with $s_{t+\tau} \triangleq \pi_{t+\tau}(s_{t+\tau-1}, x_{t+\tau})$. Here, $\gamma \in (0,1]$ is a fixed discount factor. For some applications, such as in drone positioning, the case T=2 with one-step look ahead may be adequate, but any number of T may be utilized in accordance with the teachings herein.

Accordingly, with a look ahead of T-1, the positioning module 228 may determine the smoothed position estimate $s_t^{(T)}$ according to:

$$s_t^{(T)} = \frac{1}{W^{(T)}} \left( \lambda s_{t-1} + \sum_{\tau=0}^{T-1} w_\tau^{(T)} \mathbb{E}(x_{t+\tau} \mid x_t) \right) \quad \text{EQ (7)}$$

where, $$w_0^{(T)} \triangleq 1, \qquad \text{EQ (8)}$$

$$w_\tau^{(T)} \triangleq \gamma \lambda w_{\tau-1}^{(T-1)} / W^{(T-1)}, \forall \tau \in \{1,2,\ldots,T-1\}, \quad W^{(T)} \triangleq \lambda + \sum_{\tau=0}^{T-1} w_\tau^{(T)}$$

From equation (7) it can be seen that solving for the smoothed position estimate is a convex combination of the past smooth position estimate $s_{t-1}$, the first position estimate $x_t$, and the predicted future position estimate $\mathbb{E}(x_{t+\tau}\|x_t)$, with weights determined as a function of the smoothing parameter $\lambda$ and a discounting parameter $\gamma$.

If the alternate cost function (1b) is used, then with a look ahead of T-1, the positioning module 228 may determine the smoothed position estimate $s_t^{(T)}$ according to:

$$s_t^{(T)} = \frac{1}{W^{(T)}} \left( \lambda(s_{t-1} + v_t) + \sum_{\tau=0}^{T-1} w_\tau^{(T)} \mathbb{E}(x_{t+\tau} - v_{t+1} - \ldots - v_{t+\tau} \mid x_t, v_t) \right) \quad \text{EQ (9)}$$

For a large horizon T (e.g., T>2), the quantity $w^{(T)}$ has a limit, represented by $$W^{(\infty)} \triangleq \lim_{T \to \infty} W^{(T)} = \frac{1}{2}\left(1 + (1+\gamma)\lambda + \sqrt{(1+(1+\gamma)\lambda)^2 - 4\gamma\lambda^2}\right) \quad \text{EQ (10)}$$

where convergence to this limit is exponentially fast. Thus, $$w_\tau^{(\infty)} \triangleq \lim_{T \to \infty} w_\tau^{(\infty)} = \left(\frac{\gamma\lambda}{W^{(\infty)}}\right)^\tau \quad \text{EQ (11)}$$

for every $\tau \in \{0, 1, \ldots\}$. The limiting weights $w_\tau^{(\infty)}$ can be used as an approximation for $w_\tau^{(T)}$.

In some aspects, the positioning module 228 may take into account the steady-state behavior of the trajectory when determining the smoothed position estimate. For example, note that $$\mathbb{E}(x_{t+\tau}|x_t) = G_{t,\tau} x_t + g_{t,\tau} \quad \text{EQ (12)}$$

for some deterministic $G_{t,\tau}$ and $g_{t,\tau}$. Accordingly, equation (7) may be written as:

$$s_t^{(T)} = \alpha s_{t-1}^{(T)} + H_t x_t + h_t \quad \text{EQ (13)}$$

with $$\alpha \triangleq \frac{\lambda}{w^{(T)}},$$

$$H_t = \frac{1}{W^{(T)}} \sum_{\tau=0}^{T-1} w_\tau^{(T)} G_{t,\tau} \quad \text{EQ (14)}$$

$$h_t = \frac{1}{W^{(T)}} \sum_{\tau=0}^{T-1} w_\tau^{(T)} g_{t,\tau}$$

In equation (14), $\alpha$ is a function of T, but not of the time index t. Moreover, $\alpha \in [0,1)$ by definition of $W^{(T)}$. Thus, for ease of explanation define $y_t$ as:

$$y_t \triangleq H_t x_t + h_t \quad \text{EQ (15)}$$

for all $t \in \mathbb{N}$. Thus, in some aspects, the positioning module 228 may solve the recursion for the smoothed position estimate for $s_t^{(T)}$ according to equation (16), as follows:

$$s_t^{(T)} = \sum_{k=1}^{t} \alpha^{t-k} y_k \quad \text{EQ (16)}$$

where $s_0=0$, by assumption.

Figure 5A:
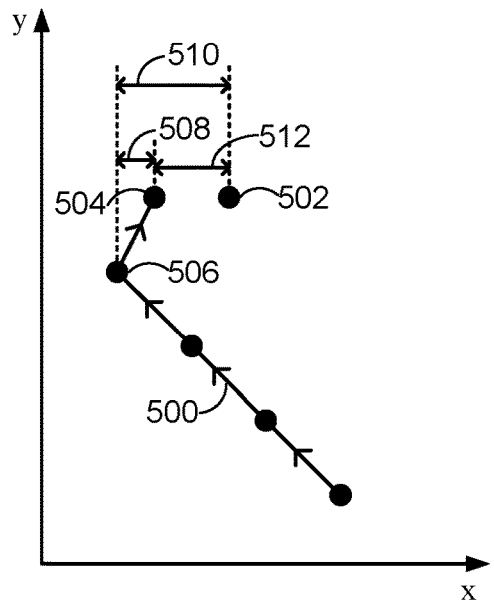
FIGS. 5A-5D illustrate example trajectories of a mobile platform, according to various aspects of the disclosure.

FIGS. 5A-5D illustrate example trajectories 500 of a mobile platform, according to various aspects of the disclosure. Trajectories 500 of FIGS. 5A-5D represent possible trajectories tracked by mobile platform 108 and/or 200. The illustrated trajectory 500, of FIG. 5A, includes a first position estimate 502, a smoothed position estimate 504, and a previous smoothed position estimate 506. The first position estimate 502 is generated by the positioning module 228 based, in part, by combining the SPS measurements 246 and the VIO measurements 248. The positioning module 228 then adjusts the first position estimate 502 by an amount 512 to generate the smoothed position estimate 504. The smoothed position estimate 504 is then added to the trajectory 500 that is tracked by the mobile platform. As shown in FIG. 5A, the difference 508 between the smoothed position estimate 504 and the previous smoothed position estimate 506 is less than the difference 510 between the first position estimate 502 and the previous smoothed position estimate 506. In some embodiments, the amount 512 that the positioning module 228 may adjust the first position estimate 502 may be limited by a fixed threshold that controls the maximum difference 508 between the smoothed position estimate 504 and the previous smoothed position estimate 506. Providing a fixed threshold to control the maximum difference 508 may control the smoothness of the trajectory 500, but may not provide the desired accuracy in the trajectory error of trajectory 500. Thus, in some examples, the amount 512 that positioning module 228 adjusts the first position estimate 502 may be dynamic, based, in part, on a magnitude in change of the first position estimate 502 from the previous smoothed position estimate 506.

Figure 5B:
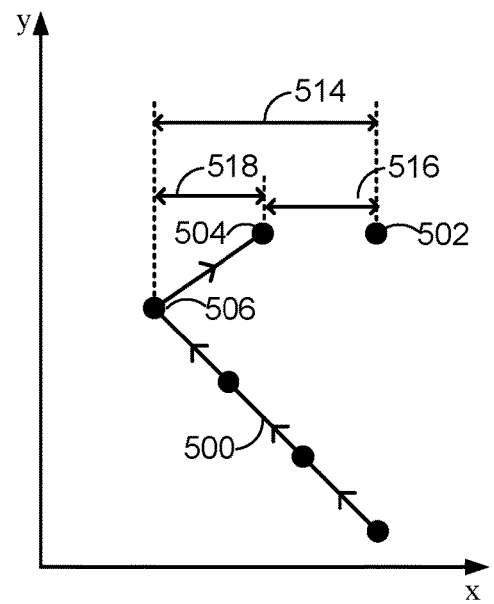

For example, the first position estimate 502 of FIG. 5B, illustrates a larger magnitude in difference 514, when compared to difference 510 of FIG. 5A. Thus, the first position estimate 502, of FIG. 5B, may be adjusted by an amount 516, such that the difference 518 is greater than the difference 508 of FIG. 5A. As discussed above, the difference 512, 516 between the smoothed position estimate 504 and the first position estimate 502 may be referred to as the tracking error, where the smoothed position estimate 504 is determined by attempting to minimize this tracking error while still considering the desired smoothness of trajectory 500.

Figure 5C:
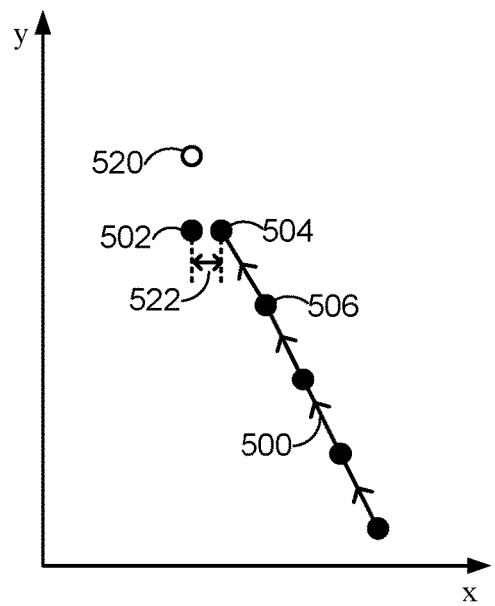
Figure 5D:
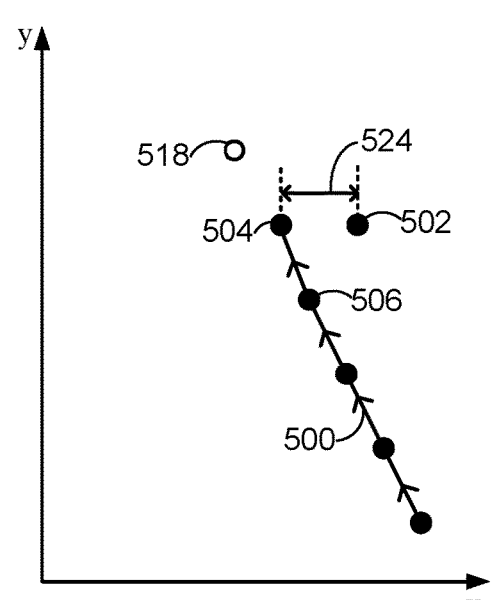

FIG. 5C illustrates the use of a predicted future position estimate 520 by positioning module 228 in determining the smoothed position estimate 504. As shown in FIG. 5C, the trajectory 500 indicates a general movement of the mobile platform to the left (i.e., along the x-axis), while the first position estimate 502 indicates a displacement of the mobile platform to the left. Since the predicted future position estimate 520 indicates that the trajectory is predicted to continue to the left, the amount 522 of adjustment to the first position estimate 502 may be relatively small (depending, in part, on the desired smoothness of trajectory 500). This is in contrast to the example shown in FIG. 5D, which illustrates a first position estimate 502 that indicates a displacement of the mobile platform to the right. The displacement of the first position estimate 502, of FIG. 5D, is inconsistent with the predicted future position estimate 518 which indicates continued movement to the left. Thus, in the example of FIG. 5D, the positioning module 228 may adjust the first position estimate 502 by an amount 524 that is relatively large. That is, the amount 524, of FIG. 5D, may be larger than the amount 522, of FIG. 5C, for adjusting the first position estimate 502 to generate the smoothed position estimate 504.

Figure 6:
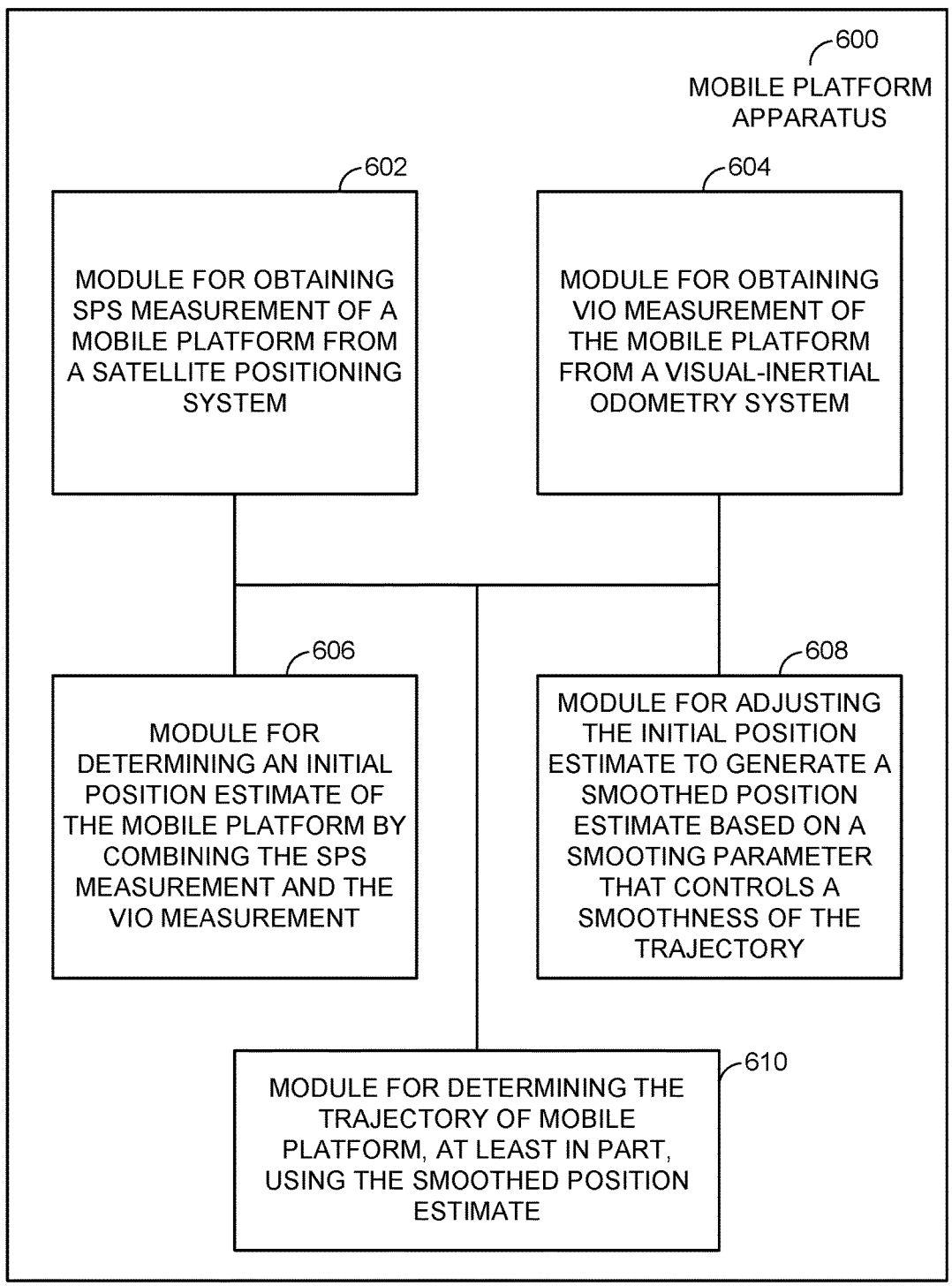
FIG. 6 illustrates several sample aspects of components that may be employed in a mobile platform configured to support determining a mobile platform trajectory, as taught herein.

FIG. 6 illustrates several sample aspects of components that may be employed in a mobile platform apparatus 600 configured to support determining a mobile platform trajectory, as taught herein. Mobile platform apparatus 600 is one possible implementation of mobile platform 108 of FIG. 1 and/or mobile platform 200 of FIG. 2.

A module 602 for obtaining an SPS measurement from one or more SPS signals acquired by an satellite positioning system of the mobile platform may correspond at least in some aspects to, for example, a SPS receiver 208 and/or positioning module 228 of FIG. 2. A module 604 for obtaining a visual-inertial odometry (VIO) measurements from a VIO system of the mobile platform may correspond at least in some aspects to, for example, VIO system 226 and/or positioning module 228 of FIG. 2. A module 606 for determining a first position estimate of the mobile platform based, at least in part, on the SPS measurement and the VIO measurement may correspond at in some aspects to, for example, positioning module 228 and/or processor 214, of FIG. 2. A module 608 for adjusting the first position estimate to generate a smoothed position estimate based on a smoothing parameter that controls a smoothness of a trajectory may correspond at least in some aspects to, for example, positioning module 228 and/or processor 214, of FIG. 2. A module 610 for determining the trajectory of the mobile platform, at least in part, using the smoothed position estimate may correspond at least in some aspects to, for example, positioning module 228, processor 214, and/or position database 230.

The functionality of the modules 602-610 of FIG. 6 may be implemented in various ways consistent with the teachings herein. In some designs, the functionality of these modules 602-610 may be implemented as one or more electrical components. In some designs, the functionality of these modules 602-610 may be implemented as a processing system including one or more processor components. In some designs, the functionality of these modules 602-610 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 6, as well as other components and functions described herein, may be implemented using any suitable means. Such means also may be implemented, at least in part, using corresponding structure as taught herein. For example, the components described above in conjunction with the "module for" components of FIG. 6 also may correspond to similarly designated "means for" functionality. Thus, in some aspects, one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, just to name a few examples.

Further, those of skill in the art will appreciate that the various illustrative logical blocks, modules, circuits, and algorithm steps described in connection with the aspects disclosed herein may be implemented as electronic hardware and computer software. To clearly illustrate this interchangeability of certain portions of hardware and software, various illustrative components, blocks, modules, circuits, and steps have been described above generally in terms of their functionality. Whether such functionality is implemented as part of the hardware or software portion of an embodiment may depend upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may, by way of example, be embodied directly in hardware, firmware, or via one or more software modules in combination with such hardware and/or firmware. A software module may, by way of example, reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any non-transitory medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of determining a trajectory of a mobile platform, the method comprising:
    obtaining a satellite positioning system (SPS) measurement from one or more SPS signals acquired by an SPS receiver of the mobile platform;
    obtaining a visual-inertial odometry (VIO) measurement of the mobile platform from a VIO system of the mobile platform;
    determining a first position estimate of the mobile platform based, at least in part, on the SPS measurement and the VIO measurement;
    adjusting the first position estimate to generate a smoothed position estimate based, at least in part, on a smoothing parameter that controls a smoothness of the trajectory,
        wherein the smoothing parameter is a fixed nonnegative number that is not a function of time and
        the amount that the first position is adjusted is limited by a fixed threshold that controls a maximum difference between the smoothed position estimate and a previous smoothed position estimate; and
    determining the trajectory of the mobile platform, at least in part, using the smoothed position estimate.

2. The method of claim 1, wherein the difference between the smoothed position estimate and the previous smoothed position estimate is less than a difference between the first position estimate and the previous smoothed position estimate.

3. The method of claim 1, wherein adjusting the first position estimate to generate the smoothed position estimate comprises:
    determining a difference between the smoothed position estimate and the first position estimate;
    determining the smoothness of the trajectory based, in part, on the smoothed position estimate and the smoothing parameter; and
    minimizing a cost function that determines a trade-off between:
        the difference between the smoothed position estimate and the first position estimate, and
        the smoothness of the trajectory.

4. The method of claim 3, wherein determining the smoothness of the trajectory comprises:
    applying the smoothing parameter to a difference between the smoothed position estimate and a previous smoothed position estimate.

5. The method of claim 4, wherein the cost function is represented by $\|s_t-x_t\|^2+\lambda\|s_t-s_{t-1}\|^2$, wherein $s_t$ is the smoothed position estimate, $x_t$ is the first position estimate, $s_{t-1}$ is the previous smoothed position estimate, and $\lambda$ is the smoothing parameter.

6. The method of claim 3, wherein determining the smoothness of the trajectory comprises:
    applying the smoothing parameter to a difference between:
        a difference between the smoothed position estimate and a previous smoothed position estimate; and
        a VIO displacement measurement included in the VIO measurement.

7. The method of claim 6, wherein the cost function is represented by $\|s_t-x_t\|^2+\lambda\|s_t-s_{t-1}-v_t\|^2$, wherein $s_t$ is the smoothed position estimate, $x_t$ is the first position estimate, $s_{t-1}$ is the previous smoothed position estimate, $v_t$ is the VIO displacement measurement, and $\lambda$ is the smoothing parameter.

8. The method of claim 1, further comprising:
    obtaining a predicted future position estimate of the mobile platform, wherein generating the smoothed position estimate is based, in part, on the predicted future position estimate.

9. The method of claim 1, wherein:
    the SPS measurement indicates a range-rate value, a pseudorange value, a velocity value, or some combination thereof corresponding to the mobile platform; and
    the VIO measurement indicates a VIO-based velocity measurement, a VIO-based displacement value, or both corresponding to the mobile platform.

10. An apparatus for determining a trajectory of a mobile platform, the apparatus comprising:
    means for obtaining a satellite positioning system (SPS) measurement from one or more SPS signals acquired by an SPS receiver of the mobile platform
    means for obtaining a visual-inertial odometry (VIO) measurement of the mobile platform from a VIO system of the mobile platform;
    means for determining a first position estimate of the mobile platform based, at least in part, on the SPS measurement and the VIO measurement;
    means for adjusting the first position estimate to generate a smoothed position estimate based, in part, on a smoothing parameter that controls a smoothness of the trajectory,
        wherein the smoothing parameter is a fixed nonnegative number that is not a function of time and
        the amount that the first position is adjusted is limited by a fixed threshold that controls a maximum difference between the smoothed position estimate and a previous smoothed position estimate; and
    means for determining the trajectory of the mobile platform, at least in part, using the smoothed position estimate.

11. The apparatus of claim 10, wherein the difference between the smoothed position estimate and the previous smoothed position estimate is less than a difference between the first position estimate and the previous smoothed position estimate.

12. The apparatus of claim 10, wherein the means for adjusting the first position estimate to generate the smoothed position estimate comprises:
    means for determining a difference between the smoothed position estimate and the first position estimate;
    means for determining the smoothness of the trajectory based, in part, on the smoothed position estimate and the smoothing parameter; and means for minimizing a cost function that determines a trade-off between:
  the difference between the smoothed position estimate and the first position estimate, and
  the smoothness of the trajectory.

13. The apparatus of claim 12, wherein the means for determining the smoothness of the trajectory comprises:
  means for applying the smoothing parameter to a difference between the smoothed position estimate and a previous smoothed position estimate, wherein the cost function is represented by $\|s_t-x_t\|^2+\lambda\|s_t-s_{t-1}\|^2$, wherein $s_t$ is the smoothed position estimate, $x_t$ is the first position estimate, $s_{t-1}$ is the previous smoothed position estimate, and $\lambda$ is the smoothing parameter.

14. The apparatus of claim 12, wherein the means for determining the smoothness of the trajectory comprises:
  means for applying the smoothing parameter to a difference between:
    a difference between the smoothed position estimate and a previous smoothed position estimate; and
    a VIO displacement measurement included in the VIO measurement, wherein the cost function is represented by $\|s_t-x_t\|^2+\lambda\|s_t-s_{t-1}-v_t\|^2$, wherein $s_t$ is the smoothed position estimate, $x_t$ is the first position estimate, $s_{t-1}$ is the previous smoothed position estimate, $v_t$ is the VIO displacement measurement, and $\lambda$ is the smoothing parameter.

15. The apparatus of claim 10, further comprising:
  means for obtaining a predicted future position estimate of the mobile platform, wherein generating the smoothed position estimate is based, in part, on the predicted future position estimate.

16. An apparatus for determining a trajectory of a mobile platform, the apparatus comprising:
  at least one processor; and
  at least one memory coupled to the at least one processor, the at least one processor and the at least one memory being configured to direct the apparatus to:
    obtain a satellite positioning system (SPS) measurement from one or more SPS signals acquired by an SPS receiver of the mobile platform;
    obtain a visual-inertial odometry (VIO) measurement of the mobile platform from a VIO system of the mobile platform;
    determine a first position estimate of the mobile platform based, at least in part, on the SPS measurement and the VIO measurement;
    adjust the first position estimate to generate a smoothed position estimate based, in part, on a smoothing parameter that controls a smoothness of the trajectory,
    wherein the smoothing parameter is a fixed nonnegative number that is not a function of time and
    the amount that the first position is adjusted is limited by a fixed threshold that controls a maximum difference between the smoothed position estimate and a previous smoothed position estimate; and
    determine the trajectory of the mobile platform, at least in part, using the smoothed position estimate.

17. The apparatus of claim 16, wherein the difference between the smoothed position estimate and the previous smoothed position estimate is less than a difference between the first position estimate and the previous smoothed position estimate.

18. The apparatus of claim 16, wherein the at least one processor and the at least one memory are configured to direct the apparatus to:
  determine a difference between the smoothed position estimate and the first position estimate;
  determine the smoothness of the trajectory based, in part, on the smoothed position estimate and the smoothing parameter; and
  minimize a cost function that determines a trade-off between:
    the difference between the smoothed position estimate and the first position estimate, and the smoothness of the trajectory.

19. The apparatus of claim 16, wherein the at least one processor and the at least one memory are configured to direct the apparatus to:
  obtain a predicted future position estimate of the mobile platform; and
  generate the smoothed position estimate based, in part, on the predicted future position estimate.

* * * * *